United States Patent [19]
Allen et al.

[11] 3,768,559
[45] Oct. 30, 1973

[54] OIL RECOVERY PROCESS UTILIZING SUPERHEATED GASEOUS MIXTURES

[75] Inventors: Joseph C. Allen, Bellaire; Thomas S. Teasdale, Houston, both of Tex.

[73] Assignee: Texaco Inc., New York, N.Y.

[22] Filed: June 30, 1972

[21] Appl. No.: 267,799

[52] U.S. Cl. .................................. 166/272, 166/303
[51] Int. Cl. ............................................. E21b 43/24
[58] Field of Search ................... 166/272, 263, 303; 210/22

[56] References Cited
UNITED STATES PATENTS

| | | |
|---|---|---|
| 2,862,558 | 12/1958 | Dixon ................................. 166/272 |
| 3,150,716 | 9/1964 | Strelzoff et al. ..................... 166/272 |
| 3,193,009 | 7/1965 | Wallace et al. ...................... 166/272 |
| 3,350,299 | 10/1967 | Hess et al. ............................. 210/22 |
| 3,350,300 | 10/1967 | Hess et al. ............................. 210/22 |
| 3,360,044 | 12/1967 | Lange .................................. 166/272 |
| 3,685,581 | 8/1972 | Hess et al. ........................... 166/272 |

*Primary Examiner*—Stephen J. Novosad
*Attorney*—Thomas H. Whaley et al.

[57] ABSTRACT

A secondary recovery process in which a superheated steam-hydrocarbon vapor mixture is injected into an oil-bearing formation and oil is recovered from a producing well located a substantial distance from the injection well.

6 Claims, 1 Drawing Figure

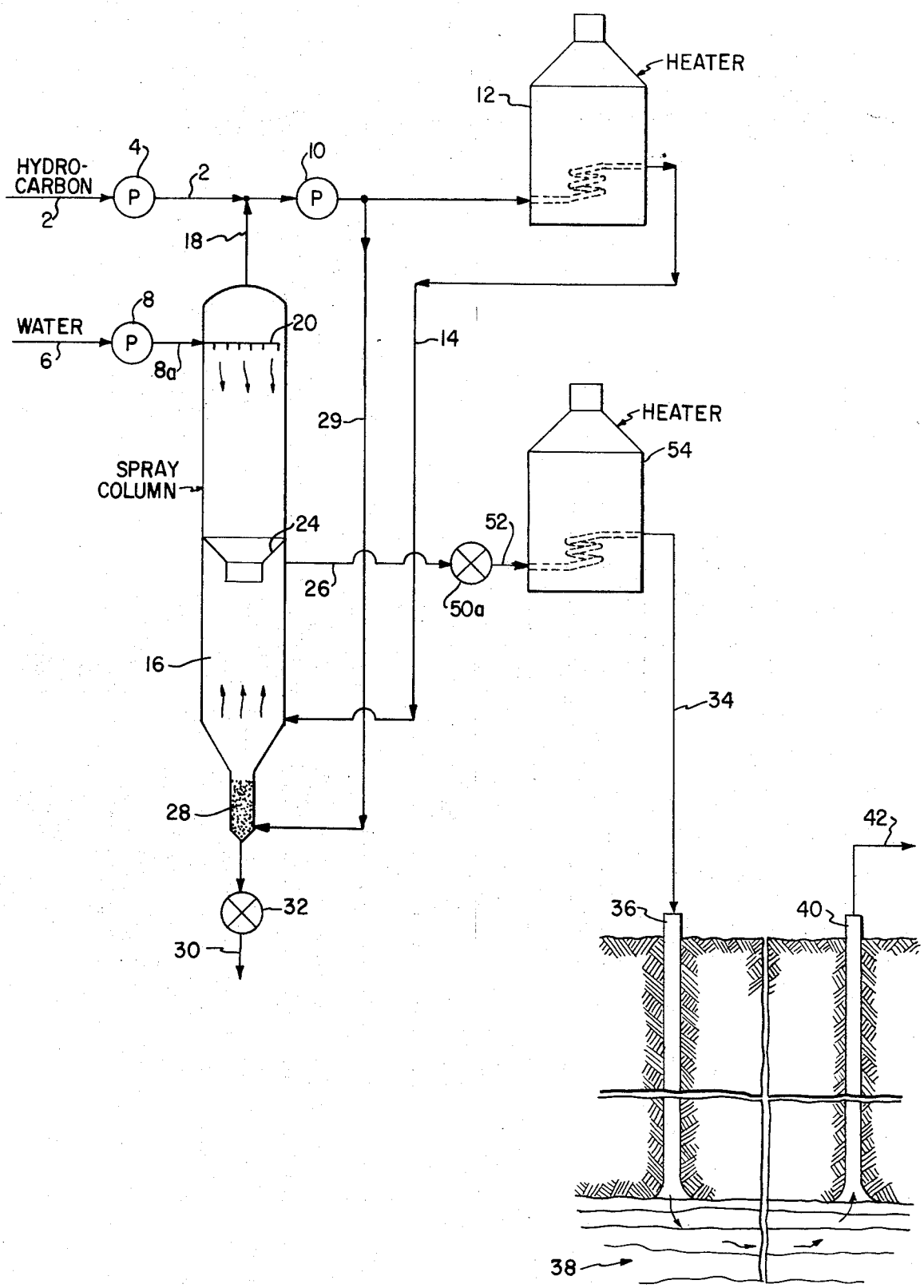

OIL RECOVERY PROCESS UTILIZING SUPERHEATED GASEOUS MIXTURES

BACKGROUND OF THE INVENTION

This invention relates to an oil recovery process and, in particular, it relates to a secondary oil recovery process in which a superheated steam-hydrocarbon vapor mixture is employed as the driving fluid.

PRIOR ART

Various methods have been proposed for stimulating the flow of oil as well as inducing driving forces effective to increase the recovery of oil from producing wells.

In its simplest form this involves the introduction into an injection well of a suitable flooding material under sufficient pressure to impose a substantial driving force upon the reservoir oil. This, for example, has been carried out with gaseous and liquid materials, notably with natural gas or with water.

More recently, however, improved results have been obtained by injecting steam into the producing formation. Also, it has been proposed to introduce hydrocarbons which are lighter than, and have a lower viscosity than the reservoir hydrocarbons. In fact, it has been found that usually a small, thin layer of hydrocarbon liquid ahead of more prosaic driving flood such as water, natural gas or steam, has tended to improve ultimate production from a spaced well.

Also among variations that have been proposed is the introduction of a mixture of steam and hydrocarbon vapors under low pressure. This process, as well as prior related processes heretofore disclosed, are described in U.S. Pat. No. 2,862,558 in which a mixture of steam and kerosene was was injected into a tar sand formation at a temperature of about 225°–500° F and at a pressure of at least 20 psig.

One particular problem which arises in steam flooding is that a substantial source of fresh water with a low solids content must be available. This poses a particular problem in areas where only small quantities of fresh water are available and where brine is produced in oil recovery operations. Such saline waters are so high in solids content and are so corrosive to oil field equipment

BRIEF STATEMENT OF THE INVENTION

The recovery process of this invention in which oil is recovered from a subterranean oil-bearing formation comprises:
a. forming from a mixture of light hydrocarbons and feed water containing dissolved solids under the influence of elevated temperature and pressure a water-hydrocarbon phase substantially free of the feed water dissolved solids and a separate water phase,
b. separating the said water phase containing the dissolved solids from the said hydrocarbon-water phase,
c. reducing the pressure on the said water-hydrocarbon phase with simultaneous heating thereof thus forming a superheated steam-hydrocarbon vapor mixture,
d. injecting the said mixture directly into the said oil-bearing formation, and
e. producing oil from the said formation.

The process of this invention is not only applicable as a well stimulation process but also may be utilized in oil recovery operations where the superheated steam-hydrocarbon vapor mixture is injected into an oil-bearing formation via an injection well, and oil is recovered via a production well located a substantial distance from the said injection well.

DETAILED DESCRIPTION OF THE INVENTION

The recovery process of this invention utilizes as the flooding medium a superheated steam-light hydrocarbon mixture having a low content of dissolved solids. Advantageously the injection of such a mixture raises the temperature which can be achieved with saturated steam resulting in complete vaporization of formation water for substantially 100 percent oil displacement efficiency.

A wide variety of superheated steam-hydrocarbon vapor mixtures may be utilized in the process of this invention. Such superheated steam-hydrocarbon vapor mixtures can comprise a mixture of superheated steam and superheated hydrocarbon vapor, a mixture of superheated steam and saturated hydrocarbon vapor or a mixture of superheated steam and hydrocarbon vapor containing a minor amount (i.e., up to about 30 weight percent based on the weight of the hydrocarbon in the vapor mixture) of liquid hydrocarbon. The actual composition of the particular superheated steam-hydrocarbon vapor mixture employed in the process of this invention will depend on the pressure and temperature at which the mixture is formed as well as the particular hydrocarbon or hydrocarbons incorporated in the vapor mixture.

Normally liquid hydrocarbons are generally suitable for use in the process of this invention. Hydrocarbons and mixtures of hydrocarbons containing from four to 15 carbon atoms per molecule are suitable for use in the process of this invention. Various petroleum fractions including kerosene, naphtha, odorless spirits and gasoline may be employed. Examples of individual hydrocarbon types which can be used in the process of the present invention, either alone or in admixture with one another, are the aliphatic hydrocarbons, including hexane, 2,3-dimethylbutane, heptane, octane, isooctane, nonane, decane, propylene tetramer, hexadecadecane, 2-methyl-1-pentane, etc.; alicyclic hydrocarbons, e.g., methylcyclopentane, cyclohexane, methylcyclohexane, dimethylcyclohexane, ethylcyclohexane, terralin, isopropylcyclohexane, cyclohexene, etc.; and aromatic hydrocarbons, e.g., benzene, toluene, etc.

The preferred hydrocarbons are those which have low toxicity and low solubility in water at temperatures in the range of 200° to 350° F at moderate pressure.

The water-hydrocarbon liquid phase solution utilized to prepare the superheated steam-hydrocarbon vapor mixture or the homogeneous water-hydrocarbon phase as it has been referred to above is an intimate intermixture.

As previously pointed out, the superheated steam-hydrocarbon vapor mixture employed in this invention is prepared from the so-called homogeneous water-hydrocarbon phase previously described. This homogeneous liquid water-hydrocarbon phase has been referred to as an intimate inter-mixture solution of two normally repugnant liquids. The preparation of such intersolutions has been described in detail in the following U.S. Pat. Nos.: 3,316,172; 3,318,805; 3,325,400; 3,350,299 & 3,350,300.

The preparation of the water-hydrocarbon liquid phase involves the extraction of water from the field water, such as brine containing dissolved solids, by a hot hydrocarbon liquid at a high temperature at which such hydrocarbon liquids are capable of selectively absorbing or dissolving a substantial proportion of water. Another requirement, of course, is that the elevated temperatures required must be accompanied by pressures sufficient to maintain both the hydrocarbon and water in liquid phase condition. The temperatures involved are considerable, normally in the region substantially above 500° F and with pressures accordingly above 1,000 psig.

As respects the combined liquid water-hydrocarbon phase employed in this invention for the preparation of the superheated steam-hydrocarbon vapor mixture, applicants do not desire to be bound by any statement regarding its precise molecular nature, whether solution or whatever other form it may be. It can, however, be asserted that this combination is in fact a liquid phase under the conditions noted and therefore as has been hitherto explained, it may be referred to simply as a phase in which the hydrocarbon forms a complex with water.

Inasmuch as the complexing operating has been thoroughly described and explained in the aforementioned patents, no further details are supplied herein other than to make reference to such above-listed patents for full description of such details and, by reference, to make such disclosures a part of the present disclosure.

The FIGURE illustrates one arrangement of apparatus for carrying out the process of this invention.

A liquid hydrocarbon, such as heptane is introduced via line 2 into pump 4 which brings the pressure of the system up sufficiently to maintain the system in liquid phase condition at the temperatures involved. Similarly, field water or brine containing a high percentage of solid materials is introduced into pump 8 via line 6 where the pressure is brought up to the system pressure. The hydrocarbon oil is then passed through circulating pump 10 and heater 12 where it is raised above the critical high temperature in the range aforementioned at which the hydrocarbon oil assumes a high extractive affinity for water. The hot oil is then transferred from the heater through pipe 14 into the lower portion of the column 16, a portion of which as hereinafter indicated, passes continuously upward through column 16 and out through line 18, from whence it is re-introduced into line 2.

The feed water or brine stream is discharged from pump 8 via line 8a into spray head 20 situated in the upper end of column 16 downwardly through the upflowing column of hydrocarbon oil.

As a result of this interaction of the two streams, therefore, the upflowing hot hydrocarbon oil continuously heats the downflowing brine so that at an intermediate level in the column the two streams have reached a complexing temperature (i.e., the temperature at which clear water-hydrocarbon of, for example, 575° F at 2,000 psi. This, in the present design, may take place at the position in the spray column just below the downcomer 24, from which outlet line 26 extends.

Therefore, flowing through the line 26 is a high pressure, high temperature complex of hydrocarbon and water, namely a continuous, clear phase comprising a solution, extract, or whatever the case may be, of molecularly intermingled oil and water. The water-hydrocarbon phase, as previously pointed out, inherently rejects the soluble content of the feed water and the insoluble salts precipitated settle downwardly into sludge chamber 28 at the bottom of column 16. The solid material forms a relatively concentrated solution in excess brine fed to the system, or, depending upon the amount of the excess feed water, a gelatinous floc. A predetermined small proportion of the recycled hydrocarbon is caused to by-pass the heater 12 by means of line 29 and control valves not shown, thereby cooling sludge column 28.

The insoluble materials may be continuously removed from the system and sent to an appropriate waste disposal system not shown via a sludge blowdown through outlet 30 controlled by valve 32. Generally, about 5 to about 10 percent of the total volume of the hydrocarbon and water separate out as the concentrated solution or phase containing the precipitated solids.

The homogeneous water-hydrocarbon phase withdrawn from column 16 via line 26 is passed through let down valve 50a where the pressure is reduced to about 1,000 psig and then into heater 54 by means of line 52 where sufficient heat is added to maintain the temperature of the resulting vapor as a superheated steam-hydrocarbon mixture at a temperature of 800° F. If heptane, for example, is utilized as the hydrocarbon, then under the conditions of this example the resulting vapor mixture would consist of superheated steam and superheated hydrocarbon vapor.

The superheated steam-hydrocarbon mixture thus formed is passed by means of line 34 to well pipe 36 controlled by suitable valves not shown. By means of well pipe 36 the superheated water hydrocarbon mixture is introduced directly into the producing formation 38 at the bottom of the well where it proceeds to intermingle with the contents of the reservoir and drive them toward a second or producing well 40, causing the produced constituents to flow upwardly in the well and be recovered through line 42.

What is claimed is:

1. A process for the recovery of oil from a subterranean oil-bearing formation which comprises:
  a. forming from a mixture of light hydrocarbons and feed water containing dissolved solids under the influence of elevated temperature and pressure a water-hydrocarbon phase and a separate water phase,
  b. separating the said water phase containing the dissolved solids from the said hydrocarbon-water phase,
  c. reducing the pressure on the said water-hydrocarbon phase with simultaneous heating thereof thus forming a superheated steam-hydrocarbon vapor mixture,
  d. injecting the said mixture directly into the said oil-bearing formation, and
  e. producing oil from the said formation.

2. The method as defined in claim 1 wherein said oil is recovered from a producing well located a substantial distance from said injection well.

3. The method according to claim 1 wherein said oil is produced from said formation by terminating said injection step and withdrawing oil from said reservoir via the injection well.

4. The method according to claim 1 wherein said hydrocarbon-water phase is prepared by heating a mixture of the light hydrocarbon and to a temperature of at least 500° F and under a pressure of about 700 to 2,500 psig.

5. The method according to claim 1 wherein the said mixture of light hydrocarbon and feed water is brought to the elevated temperature condition in step (a) by continuously heating the light hydrocarbon stream and by bringing the feed water stream into direct contact with the hot light hydrocarbon, such that the boiler scaling is obviated.

6. The method according to claim 1 wherein the said hydrocarbon employed is heptane.

* * * * *